March 15, 1966     H. MILLER     3,240,446
PRESELECT ALTITUDE CONTROL SYSTEM FOR AIRCRAFT
Filed Oct. 15, 1963
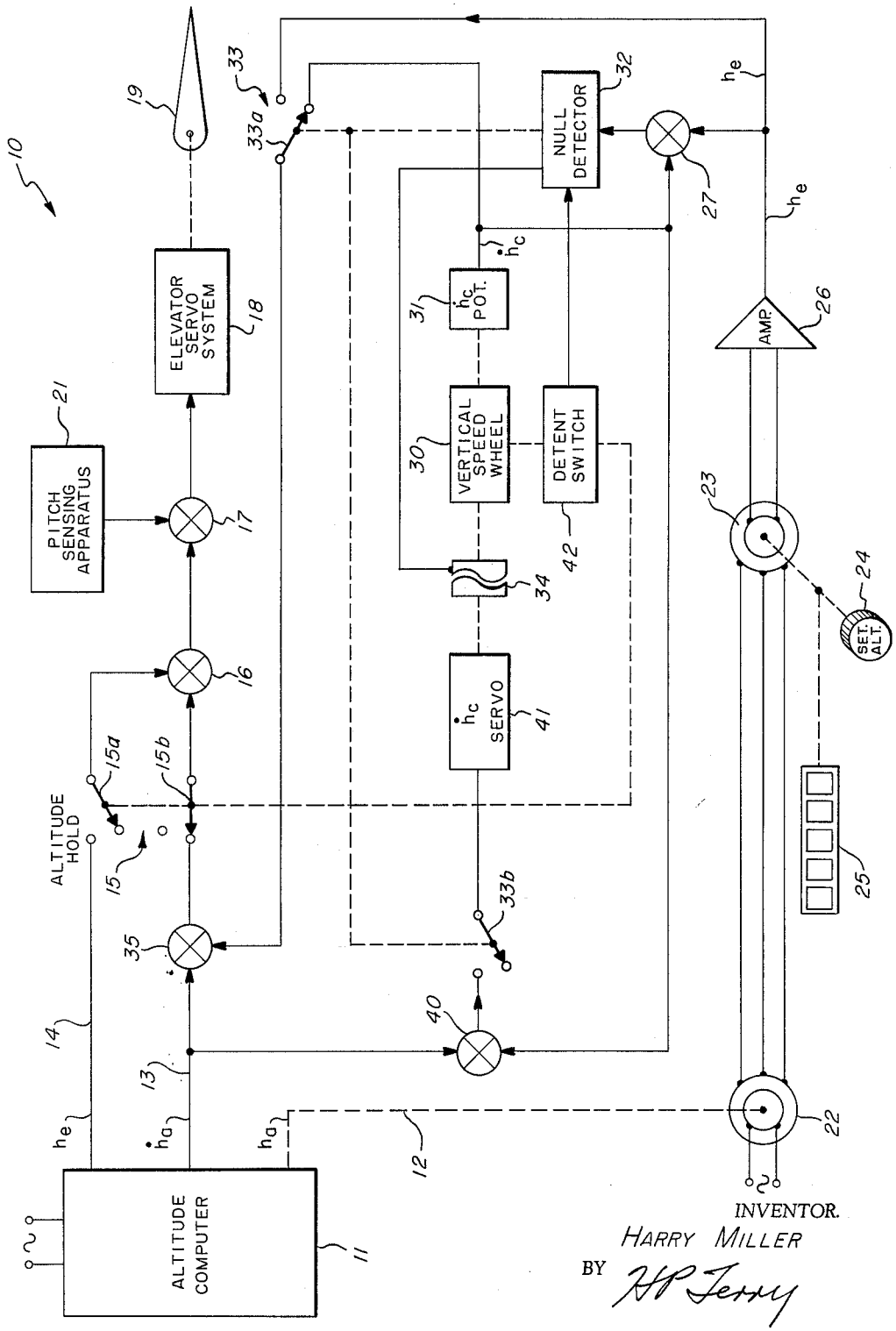
INVENTOR.
HARRY MILLER
BY
ATTORNEY United States Patent Office 3,240,446
Patented Mar. 15, 1966

3,240,446
PRESELECT ALTITUDE CONTROL SYSTEM
FOR AIRCRAFT
Harry Miller, Scottsdale, Ariz., assignor to Sperry Rand Corporation, Great Neck, N.Y., a corporation of Delaware
Filed Oct. 15, 1963, Ser. No. 316,417
10 Claims. (Cl. 244—77)

This invention relates to flight control systems and particularly to apparatus for asymptotically approaching and maintaining a predetermined altitude automatically.

Previous apparatus of this type was operationally cumbersome, and relatively unsafe in that control of vertical speed of the aircraft during capture of the predetermined altitude was not under direct pilot control. In certain situations this could result in the aircraft developing an adverse angle of attack. Further, prior art apparatus of this type requires manipulation of several control knobs, the operational sequence of which requires careful timing at a time when the human pilot would normally have his attention directed elsewhere.

It is an object of the present invention to provide apparatus for asymptotically approaching and thereafter maintaining a predetermined altitude automatically and reliably.

It is an additional object of the present invention to provide apparatus for asymptotically approaching a predetermined altitude automatically upon selecting the desired altitude.

It is another object of the present invention to provide apparatus for controlling an aircraft which upon selecting the desired altitude will cause the aircraft to automatically approach at a desired vertical speed and asymptotically capture a predetermined altitude and thereafter maintain said altitude with a minimum of attention by the human pilot and requiring only one operation on his part.

The above and other objects are accomplished by comparing a commanded rate of change signal with a signal representative of the deviation from a desired altitude. The altitude deviation signal is arranged such that when it is equal to the commanded rate of change of altitude signal, null detecting apparatus responsive to the signals switches the guidance of the aircraft from signals representative of the difference between the actual rate of change of altitude and the commanded rate of change of altitude to signals representative of the difference of the actual rate of change of altitude and the deviation from the desired altitude. In this manner the human pilot selects the commanded rate of change of altitude and when the null sensor operates to switch the signals as indicated above, the aircraft is asymptotically guided to approach the desired altitude. When the aircraft reaches the desired altitude the commanded rate of change of altitude apparatus is automatically reset and the automatic flight control system is responsive to the altitude deviation signal only to thereafter maintain said altitude.

The above and other objects will become apparent by referring to the drawing which is a schematic block diagram of an automatic flight control system incorporating the present invention.

The automatic flight control system 10 includes an altitude computer 11 which may form a portion of an air data system which provides signals representative of the actual altitude $h_a$ in the form of a shaft rotation with respect to a shaft 12, an actual rate of change of altitude $\dot{h}_a$ signal on a lead 13, and an altitude hold $h_e$ signal on a lead 14 representative of the deviation of the aircraft from a desired altitude. In the altitude hold mode of operation, the altitude deviation signal $h_e$ on the lead 14 is connected through the contact arm 15a of a ganged switch 15, algebraic summation device 16, and another algebraic summation device 17 to an elevator servo system 18 which in turn is connected to drive the elevators 19 in a conventional manner. Pitch motion sensing apparatus 21 is connected to another input terminal of the algebraic summation device 17 for providing, for example, pitch attitude and pitch rate signals from a vertical gyro and a rate gyro, respectively, in a conventional manner, well known to those skilled in the art.

A synchro transmitter 22 has its rotor connected to be responsive to the rotation of the altitude shaft 12 to provide a signal representative of the actual altitude $h_a$ of the aircraft and its stator connected to the stator of a synchro control transformer receiver 23 which in turn has its rotor manually settable by means of an altitude select knob 24. The altitude select knob 24 is also connected to an altitude select readout counter 25. The signal from the synchro 23 is thus representative of the difference between the actual altitude and the selected altitude, i.e., the deviation from the selected altitude $h_e$, and has an amplitude and phase representative of the amount and sense, respectively, of the deviation. This signal is amplified in an attitude preselect amplifier 26 and connected to one input terminal of a comparison device 27.

To provide a signal representative of the desired or commanded rate of change of altitude $\dot{h}_c$, a vertical speed wheel 30 which is usually mounted on a pedestal type of flight controller (not shown) is connected to an $\dot{h}_c$ potentiometer 31. The $\dot{h}_c$ signal has an amplitude and phase representative of the desired rate and direction of the commanded change of altitude. The $\dot{h}_c$ potentiometer 31 is connected to provide a signal representative of the commanded rate of change altitude $\dot{h}_c$ to another input terminal of the comparison device 27 which has its output terminal connected to a null detector 32 for actuating a ganged switch 33 having contact arms 33a and 33b. The null detector is electrically connected to an electromagnetic clutch 34 for engaging the clutch 34 when the switch 33 is actuated.

The $\dot{h}_c$ potentiometer 31 is also connected when the contact arm 33a is in its downward position, as shown, to an input terminal of an algebraic summation device 35 which has its other input terminal connected to the lead 13 for providing a signal representative of the actual rate of change of altitude $\dot{h}_a$. The output terminal of the algebraic summation device 35 is connected through the contact arm 15b of the switch 15 to another input terminal of the algebraic summation device 16 when the contact arm 15b is in its downward position as shown.

The actual rate of change of altitude $\dot{h}_a$ signal on the lead 13 is also connected to an input terminal of an algebraic summation device 40 which has its other input terminal connected to receive the $\dot{h}_c$ signal from the potentiometer 31. The output terminal of the summation device 40 is connected to an $\dot{h}_c$ servo 41 when the contact arm 33b is in its upward position. The $\dot{h}_c$ servo 41 is connected to one side of the clutch 34 which has its other side connected to the vertical speed wheel 30.

The vertical speed wheel 30 further includes a detent switch 42 which is connected to control the switch 15 when the vertical speed wheel 30 is in its zero or altitude hold position. With the contact arm 33a in its upward position, the altitude deviation $h_e$ signal from the amplifier 26 is connected to the algebraic summation device 35.

In operation, with the aircraft in any desired mode of operation, for example, the vertical speed mode, the clutch 34 is deenergized in order that the $\dot{h}_c$ servo 41 is not connected to the vertical speed wheel 30, and the switches 15 and 33 are in their downward position as shown. The human pilot selects a desired or predetermined altitude by adjusting the altitude set knob 24 to the desired altitude as indicated on the readout counter 25. This positions the rotor of the synchro receiver 23 to provide a signal representative of the deviation from the desired altitude $h_e$. The output of the synchro receiver 23 will trigger the null detector 32 at an altitude deviation which is proportional to the aircraft's vertical speed which will then initiate an asymptotic approach to the desired altitude with a fixed time constant regardless of the initial vertical speed with which the aircraft is approaching the desired altitude, in a manner to be explained.

The human pilot also selects a desired vertical speed and direction of change of altitude by rotating the vertical speed wheel 30 which has graduations thereon representing climb and descent rates of vertical speed to the desired value, for example, 1800 feet per minute or 30 feet per second. The $\dot{h}_c$ potentiometer 31 then provides an electrical signal representative of the vertical speed selected on the wheel 30. The calibration of the wheel 30 and the $\dot{h}_c$ potentiometer 31 must be correlated with the voltage from the synchro receiver 23 in order to operate the null detector 32 at a predetermined distance from the desired altitude. For example, the calibration of the wheel 30 and the $\dot{h}_c$ potentiometer 31 may be such that a command of 30 feet per second provides an output from the potentiometer 31 of 0.9 volt which is consistent with a gradient of 0.5 volt per 1000 feet per minute.

In order to achieve a specific time constant for the asymptotic approach to the desired altitude, for example, 20 seconds, the asymptotic control should be initiated at an altitude deviation from the desired value of 20 seconds×30 feet per second to equal 600 feet. At this time the output from the altitude preselect amplifier 26 should be consistent with a vertical speed command of 30 feet per second or 0.9 volt. The gain of the amplifier 26 on the output of the synchro receiver 23 is adjusted to obtain proper blending and time constant, for example, the gradient of the transmitter synchro 22 may be .0036 degree per foot. The voltage of the receiver synchro output will be .432 at an altitude deviation of 600 feet assuming a synchro transmission gradient of .2 volt per degree. In order to provide 0.9 volt, the gain of the amplifier 26 should be approximately 2.

With the vertical speed wheel 30 adjusted to a predetermined rate of change of altitude $\dot{h}_c$, the $\dot{h}_c$ signal from the potentiometer 31 is connected through the contact arm 33a which is normally in its downward position to the algebraic summation device 35 where it is compared with the $\dot{h}_a$ signal and the difference therebetween operates the elevator servo system 18 to position the elevator 19 in order that the airplane climbs towards the desired altitude at the desired rate. As the airplane climbs toward the desired altitude, the output voltage $h_e$ of the synchro receiver 23 will decrease towards null. When the voltage of the $h_e$ signal equals that from the $\dot{h}_c$ potentiometer 31 in the comparison device 27, the null detector 32 will operate to place the contact arms 33a and 33b in their upward positions and to energize the clutch 34. This causes the $h_e$ signal to be applied to the algebraic summation device 35 where it is now compared with the $\dot{h}_a$ signal in lieu of the $\dot{h}_c$ signal. The $h_e$ signal is proportional to the deviation of the airplane from the desired altitude and being used as a vertical speed command to the autopilot 10 and compared with the $\dot{h}_a$ signal causes the aircraft to asymptotically approach the desired altitude.

The $\dot{h}_c$ signal from the potentiometer 31 is no longer effective in the autopilot 10 but now becomes effective through the contact arm 33b with the $\dot{h}_a$ signal from the algebraic summation device 40 to operate the $\dot{h}_c$ servo 41 to rotate the vertical speed wheel 30 towards its zero or altitude hold position. When the vertical speed wheel 30 is rotated to its zero or altitude hold position, it causes the detent switch 42 to operate to place the contact arms 15a and 15b in their upward positions and simultaneously disables the null detector 32 causing the switch 33 to be returned to its normally downward position and deenergizing the clutch 34. The null detector 32 may be disabled, for example, by interrupting the $B+$ power to the null detector. This removes the vertical speed command error signal from the summation device 35 in the pitch channel of the autopilot 10 by opening the contact arm 15b of the switch 15 and instead introduces the altitude hold signal $h_e$ from the altitude computer 11 into the pitch channel through the contact arm 15a for maintaining the desired altitude.

It will be appreciated that the above-described sequence of operations has reset the system for subsequent selection of another desired altitude and from the time that the altitude was initially selected, the aircraft was automatically controlled to fly at the selected rate of vertical speed and to asymptotically approach and be maintained at the desired altitude without further consideration by the human pilot.

From the foregoing description, it will be appreciated that the present invention provides the following special features:

(1) The automatic pilot anticipates the preselected altitude and "capture" without overshoot.

(2) The pilot may use any automatic pilot mode to approach the preselected altitude.

(3) The auxiliary preselect altitude components are only used during the "capture" phase; any time after which the next desired altitude may be dialed and armed for subsequent maneuvers.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In apparatus for aircraft for automatically and asymptotically approaching a predetermined altitude,
  (a) means for generating a $\dot{h}_a$ signal representative of the actual rate of change of altitude of said aircraft,
  (b) manually settable commanded rate of change of altitude means for generating a $\dot{h}_c$ signal representative of the commanded rate of change of altitude,
  (c) means including manually settable altitude means for generating a $h_e$ signal representative of the deviation of said aircraft from said predetermined altitude,
  (d) means including autopilot utilization means for controlling the flight path of said aircraft in pitch,
  (e) including first comparison means responsive to said $\dot{h}_a$ signal and said $\dot{h}_c$ signal for providing a first difference signal representative of the difference therebetween to said autopilot utilization means when said aircraft is in excess of a predetermined distance from said predetermined altitude, and
  (f) means including second comparison means responsive to said $\dot{h}_c$ signal and said $h_e$ signal for automatically rendering said aircraft utilization means responsive to the difference between said $\dot{h}_a$ signal and said $h_e$ signal when said aircraft reaches said predetermined distance from said predetermined altitude whereby said aircraft automatically and asymptotically approaches said predetermined altitude.

2. In apparatus of the character described in claim 1 in which said last-mentioned means further includes means for automatically returning said manually settable commanded rate of change of altitude means to zero as a function of the difference between said $\dot{h}_a$ signal and said $\dot{h}_c$ signal.

3. In apparatus of the character described in claim 2 in which said last-mentioned means of claim 1 further includes means for rendering said aircraft utilization means responsive to a signal representative of the deviation of said aircraft from said predetermined altitude and renders said $\bar{h}_a$ and first $h_e$ signals ineffective whereby said aircraft asymptotically approaches said predetermined altitude and is automatically maintained thereat.

4. In apparatus for aircraft for automatically and asymptotically approaching a desired altitude,
  (a) altitude sensing means for generating first and second signals representative of the altitude and rate of change of altitude respectively of said aircraft,
  (b) manually settable commanded rate of change of altitude means for generating a third signal representative of the commanded rate of change of altitude,
  (c) manually settable altitude selecting means for generating a fourth signal representative of said desired altitude,
  (d) means responsive to said first and fourth signals for providing a fifth signal representative of the deviation of said aircraft from said desired altitude,
  (e) and means including comparison means responsive to said third and fifth signals for enabling said aircraft to be controlled by the difference between said second and third signals when said aircraft is in excess of a predetermined distance from said desired altitude and sequentially by the difference between said second and fifth signals when said aircraft reaches said predetermined distance from said desired altitude whereby said aircraft asymptotically approaches said desired altitude automatically.

5. In apparatus for aircraft for automatically and asymptotically approaching a predetermined altitude,
  (a) air data sensing means for generating $h_a$ and $\bar{h}_a$ signals representative of the actual altitude and rate of change of altitude respectively of said aircraft,
  (b) manually settable commanded rate of change of altitude means for generating a $\bar{h}_c$ signal representative of a commanded rate of change of altitude,
  (c) manually adjustable altitude selecting means for providing a $h_c$ signal represenative of said predetermined altitude,
  (d) first comparison means responsive to said $h_a$ and $h_c$ signals for providing a $h_e$ signal representative of the difference therebetween,
  (e) and means including second comparison means responsive to said $h_e$ and $\bar{h}_c$ signals including null detecting means operable upon said $\bar{h}_c$ signal becoming equal to said $h_e$ signal for enabling said aircraft to be guided by the difference between said $\bar{h}_a$ and $\bar{h}_c$ signals when said aircraft is in excess of a predetermined distance from said predetermined altitude and for sequentially enabling said aircraft to be guided by the difference in said $\bar{h}_a$ and $h_e$ signals thereafter whereby said aircraft asymptotically approaches said pretermined altitude automatically.

6. In apparatus of the character described in claim 5 further including
  (a) servo means disengageably connected to drive said manually settable commanded rate of change of altitude means, and
  (b) said null detecting means further including means for rendering said servo means responsive to the difference between said $\bar{h}_a$ and $\bar{h}_c$ signals for resetting said manually settable commanded rate of change of altitude means to zero upon reaching said predetermined altitude.

7. In apparatus of the character described in claim 6 further including switching means actuated by said manually settable commanded rate of change of altitude means for rendering only said $h_e$ signal effective for controlling said aircraft to maintain said predetermined altitude when said manually settable commanded rate of change of altitude means is returned to zero.

8. In apparatus for aircraft for automatically and asymptotically approaching a predetermined altitude,
  (a) air data sensing means for generating $h_a$ and $\bar{h}_a$ signals representative of the actual altitude and rate of change of altitude respectively of said aircraft,
  (b) manually settable commanded rate of change of altitude means for generating a $\bar{h}_c$ signal representative of a commanded rate of change of altitude,
  (c) manually adjustable altitude selecting means for providing a $h_c$ signal representative of said predetermined altitude,
  (d) first comparison means responsive to said $h_a$ and $h_c$ signals for providing a $h_e$ signal representative of the difference therebetween,
  (e) second comparison means responsive to said $h_e$ and $\bar{h}_c$ signals,
  (f) servo means disengageably connected to drive said manually settable commanded rate of change of altitude means, and
  (g) means including null detecting means connected to said second comparison means and having a first condition prior to said $h_e$ and $\bar{h}_c$ signals being equal in which the difference between said $\bar{h}_a$ and $\bar{h}_c$ signals is effective for controlling said aircraft and said servo means is ineffective and also having a second condition when said $h_e$ and $\bar{h}_c$ signals becomes equal in which the difference between said $\bar{h}_a$ and $h_e$ signals is effective for controlling said aircraft and said servo means is effective whereby said aircraft asymptotically approaches said predetermined altitude automatically.

9. In apparatus of the character described in claim 5 in which
  (a) said null detecting means further includes means for rendering said servo means responsive to the difference between said $\bar{h}_a$ and $\bar{h}_c$ signals for resetting said manually settable commanded rate of change of altitude means to zero upon reaching said predetermined altitude.

10. In apparatus of the character described in claim 9 further including switching means actuated by said manually settable commanded rate of change of altitude means for rendering only said $h_e$ signal effective for controlling said aircraft to maintain said predetermined altitude when said manually settable commanded rate of change of altitude means is returned to zero.

No references cited.

FERGUS S. MIDDLETON, *Primary Examiner.*